US010920714B2

(12) United States Patent
Mahaffy et al.

(10) Patent No.: US 10,920,714 B2
(45) Date of Patent: Feb. 16, 2021

(54) STABLE HYBRID ROCKET TECHNOLOGY

(71) Applicant: Exquadrum, Inc., Adelanto, CA (US)

(72) Inventors: Kevin E. Mahaffy, Oak Hills, CA (US); Byron Henning, Lancaster, CA (US); Korey Robert Kline, Miami, FL (US); Philip Pelfrey, Jupiter, FL (US); Eric Schmidt, Hesperia, CA (US); Elias Wilson, Palmdale, CA (US)

(73) Assignee: EXQUADRUM, INC., Adelanto, CA (US)

(*) Notice: Subject to any disclaimer, the term of this patent is extended or adjusted under 35 U.S.C. 154(b) by 1465 days.

(21) Appl. No.: 14/212,974

(22) Filed: Mar. 14, 2014

(65) Prior Publication Data

US 2016/0032867 A1 Feb. 4, 2016

Related U.S. Application Data

(60) Provisional application No. 61/788,790, filed on Mar. 15, 2013.

(51) Int. Cl.
*F02K 9/52* (2006.01)
*F02K 9/34* (2006.01)
*F02K 9/97* (2006.01)
*F02K 9/72* (2006.01)

(52) U.S. Cl.
CPC ............ *F02K 9/52* (2013.01); *F02K 9/34* (2013.01); *F02K 9/72* (2013.01); *F02K 9/97* (2013.01)

(58) Field of Classification Search
CPC ..... F02K 9/34; F02K 9/52; F02K 9/72; F02K 9/97
See application file for complete search history.

(56) References Cited

U.S. PATENT DOCUMENTS 3,112,611 A * 12/1963 Adamson .................. F02K 9/62 60/228
3,112,612 A * 12/1963 Adamson .................. F02K 9/62 239/265.25

(Continued)

OTHER PUBLICATIONS

Dennis, et al., "Design of a N2O/HTPB Hybrid Rocket Motor utilizing a Toroidal Aerospike Nozzle", AIAA-2010-183, 48th AIAA Aerospace Sciences Meeting including the New Horizons Forum and Aerospace Exposition, Orlando, Florida, Jan. 4-7, 2010, pp. 1-11.*

(Continued)

*Primary Examiner* — Lorne E Meade
(74) *Attorney, Agent, or Firm* — Hamre Schumann Mueller & Larson, P.C.

(57) ABSTRACT

A hybrid rocket engine is described that achieves stable, highly efficient hybrid combustion by having a core flow of fuel-rich gas generator gases, with the flow being surrounded with an annular injection of oxidizer. The fuel-rich gas serves to vaporize and decompose the oxidizer, such as nitrous oxide, and prepare it for effective, stable combustion. In one embodiment, this is done at the head-end of a combustion chamber. The combustion products can then be expanded through a nozzle to create thrust. The engine can be an upper stage engine that can include modular thrust chambers and an integrated aerospike nozzle. The thrust chambers can be arranged in an array that rings the top of the aerospike nozzle.

10 Claims, 8 Drawing Sheets

(56) References Cited

U.S. PATENT DOCUMENTS

| | | | | | |
|---|---|---|---|---|---|
| 3,127,739 | A | * | 4/1964 | Miller | F02K 9/34 |
| | | | | | 102/378 |
| 3,453,958 | A | * | 7/1969 | Lai | F41J 9/10 |
| | | | | | 102/336 |
| 3,486,339 | A | * | 12/1969 | Roys | F02K 7/105 |
| | | | | | 60/761 |
| 3,613,583 | A | * | 10/1971 | Lai | F42B 4/26 |
| | | | | | 102/336 |
| 3,712,063 | A | * | 1/1973 | Andrysiak | F02K 9/52 |
| | | | | | 60/265 |
| 3,740,945 | A | * | 6/1973 | Lovingham | F02K 9/52 |
| | | | | | 60/204 |
| 3,792,669 | A | * | 2/1974 | Ueno | F02K 9/70 |
| | | | | | 431/91 |
| 3,863,442 | A | * | 2/1975 | Schmidt | F02K 9/52 |
| | | | | | 60/258 |
| 5,010,730 | A | * | 4/1991 | Knuth | F02K 9/72 |
| | | | | | 60/246 |
| 5,857,323 | A | * | 1/1999 | Beveridge | F02K 9/52 |
| | | | | | 239/424.5 |
| 6,205,770 | B1 | * | 3/2001 | Williams | F02K 9/48 |
| | | | | | 60/204 |
| 6,244,040 | B1 | * | 6/2001 | Adzhian | F02K 9/52 |
| | | | | | 60/258 |
| 8,056,319 | B2 | * | 11/2011 | Bulman | F02K 7/10 |
| | | | | | 60/225 |
| 2005/0241294 | A1 | * | 11/2005 | Cesaroni | F02K 9/52 |
| | | | | | 60/251 |
| 2009/0260343 | A1 | * | 10/2009 | Woodruff | F02K 9/30 |
| | | | | | 60/204 |

OTHER PUBLICATIONS

Bono, Philip and Gatland, Kenneth, Frontiers of Space, MacMillian Publishing Co. Inc., New York, 1976, pp. 62-73.*

Robert A. Wasko: "Performance of Annular Plug and Expansion-Deflection Nozzles Incluing External Flow Effects at Transonic Mach Numbers"; NASA Technical Note, NASA TN D-4462, National Aeronautics and Space Administration, Washington, D.C., Apr. 1968 (36 pages).

Simmons, Joseph R., III, Design and Evaluation of Dual-Expander Aerospike Nozzle Upper Stage Engine (Dissertation), Air Force Institute of Technology, Wright-Patterson Air Force Base, Ohio, Sep. 2014, AFIT-ENY-DS-14-S-06 (376 pages).

* cited by examiner $W_A < W_B$
$H_A < H_B$

STABLE HYBRID ROCKET TECHNOLOGY

STATEMENT OF GOVERNMENT INTEREST

The hybrid engine disclosed herein was in part made with U.S. government support under contract NNX12CG06P awarded by the National Aeronautics and Space Administration (NASA). The U.S. government has certain rights in the invention.

FIELD

A hybrid rocket engine for use in a propulsion system for flight vehicles, such as aircraft, missiles, satellites and other vehicles that rely upon rocket propulsion.

BACKGROUND

Modern solid rocket boosters, such as the Space Shuttle's Reusable Solid Rocket Motor, typically use composite solid propellant. In a composite solid propellant, a liquid binder material, such as hydroxyl terminated polybutadiene (HTPB), is used to surround and encapsulate powdered solid ingredients. These powdered additives include oxidizers, such as ammonium perchlorate (AP), and fuels, such as aluminum. The liquid binder then cures over time to form a rubbery solid material.

The solid propellants are formulated to be as near stoichiometric as possible. However, true stoichiometric propellants cannot typically be achieved in practice because a higher binder content is needed to meet the mechanical properties requirements of the solid propellant than is needed to optimize combustion. In practice, this leaves the solid propellant burning slightly fuel-rich. Significant research has been conducted over the years to try and maximize the amount of oxidizer particles in the propellant.

In contrast to solid rocket motor propellants, the objective of a solid propellant gas-generator is to minimize the amount of solid oxidizer that needs to be added to the propellant. The solid propellant gas-generator formulator will seek to add only enough oxidizer to produce a burn rate that meets the requirements of the booster design.

Solid rocket motors are generally lower performing than liquids, but also have a lower cost. They are also commonly considered to have higher reliability, but are typically single-use, most have no re-start capability, are not throttleable (in their basic, low-cost form, or have pre-defined throttle profiles cast into the grain), and have high vibrations. While liquid propulsion provides high performance, are throttleable, and have re-start capability, this comes with higher cost. However, cryogenic liquid propellants, and especially turbopump-fed systems, are impractical in some instances. Storable liquids are likewise impractical due to the hazards associated with toxicity and their potential for unplanned, hypergolic ignition.

SUMMARY

A hybrid rocket engine is described that achieves stable, highly efficient hybrid combustion by having a core flow of fuel-rich gas generator gases, with the flow being surrounded with an annular injection of oxidizer. The fuel-rich gas serves to vaporize and decompose the oxidizer, such as nitrous oxide, and prepare it for effective, stable combustion. The core flow of fuel-rich gases also serves to force the annular sheet of oxidizer to move radially outward to more effectively mix and combust with the fuel-rich/gas generator fuel-rich layer on the walls of the combustion chamber. This helps in increasing fuel regression rates and increasing combustion efficiency. In one embodiment, the oxidizer is injected at the head-end of the combustion chamber. The combustion products can then be expanded through a nozzle to create thrust.

In another embodiment, the combustion chamber can be lined with inert insulative material or gas generator fuel.

In still another embodiment, an array of smaller combustion chambers can be disposed around the base of an aerospike.

The hybrid engine can take on a number of different configurations that employ the concept of a core flow of fuel-rich gas generator gases surrounded with an annular injection of oxidizer into the flow. In one example, the hybrid engine is an upper stage engine that can include modular thrust chambers and an integrated aerospike nozzle. The thrust chambers can comprise a plurality of discrete combustion chambers that ring the top of the aerospike nozzle. The core flow of fuel-rich gas from the gas generator and the injected oxidizer gas mix and combust in the modular thrust chambers. The combusted gases exit the modular thrust chambers and then expand along the outer surface of the aerospike nozzle to create thrust.

The hybrid engine with a core flow of fuel-rich gas generator gases surrounded with an annular injection of oxidizer into the flow produces a stable, highly efficient hybrid combustion.

DRAWINGS

Figure 7B:
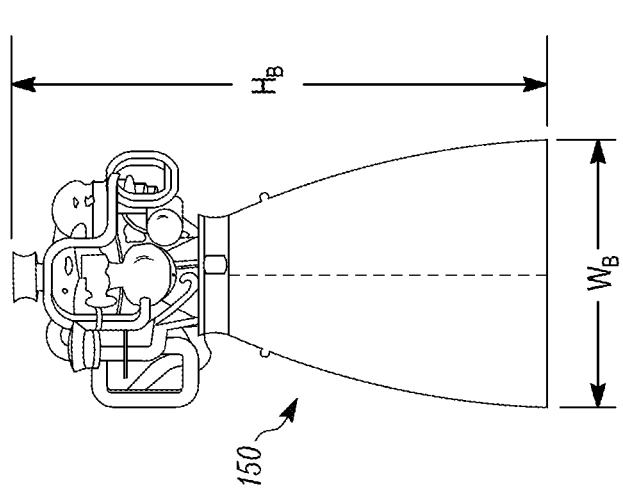
Figure 7A:
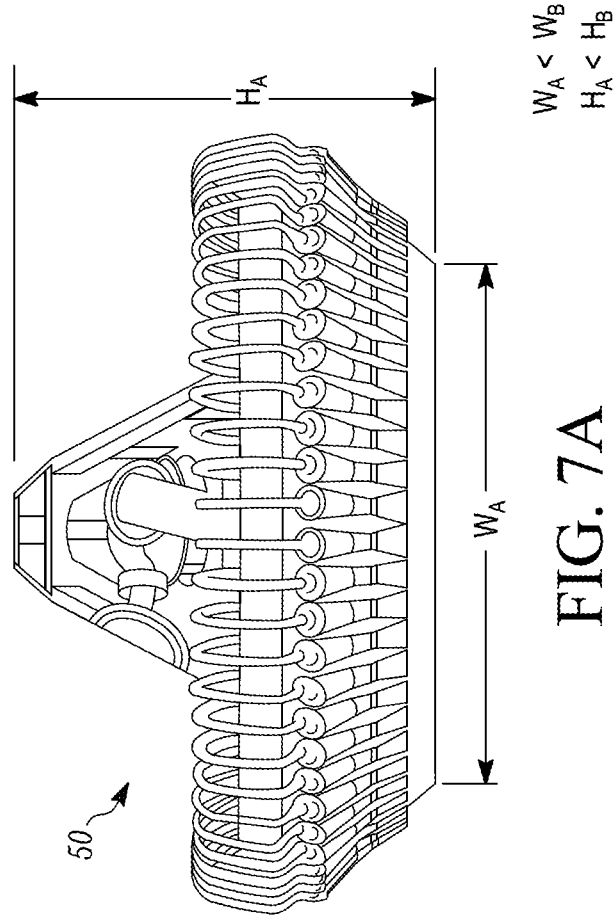

FIGS. 7A and 7B compare height and width of the hybrid engine described herein to a prior art booster engine.

DETAILED DESCRIPTION

Figure 1:
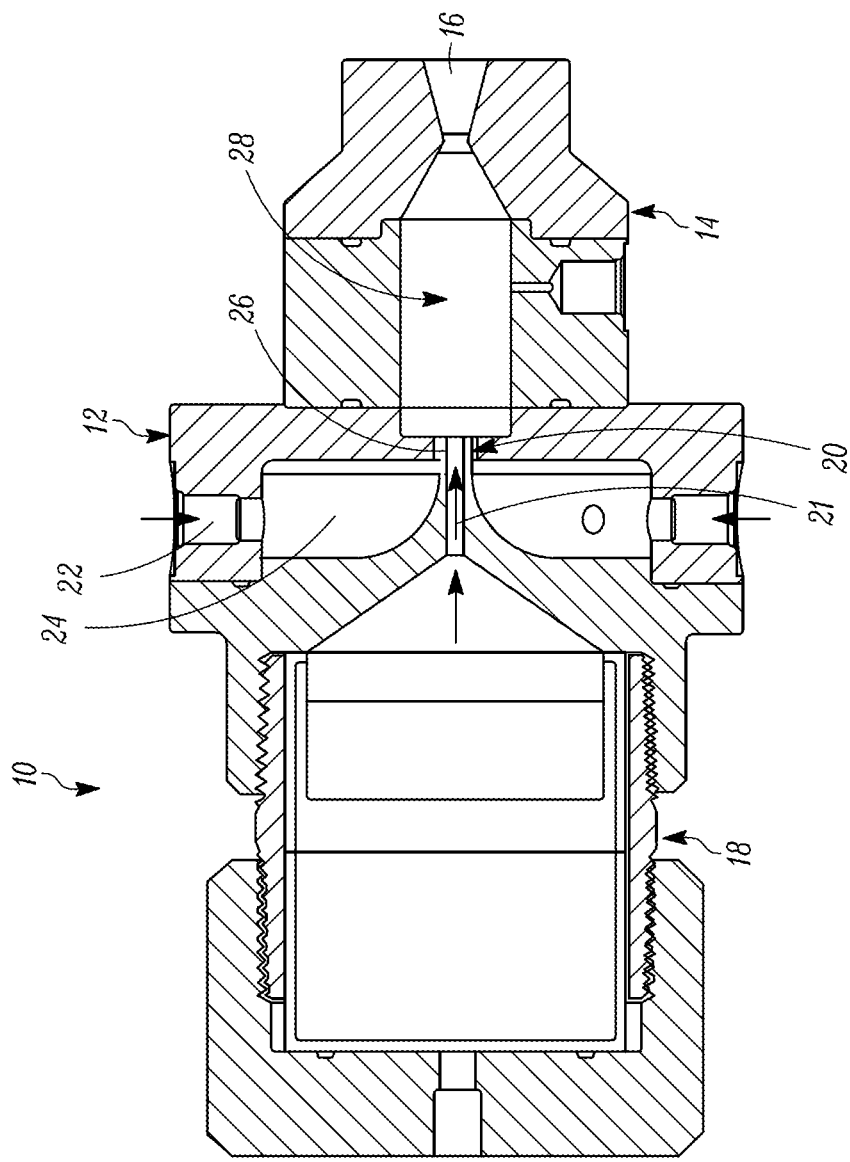
FIG. 1 illustrates an example of the hybrid rocket engine described herein.
Figure 2:
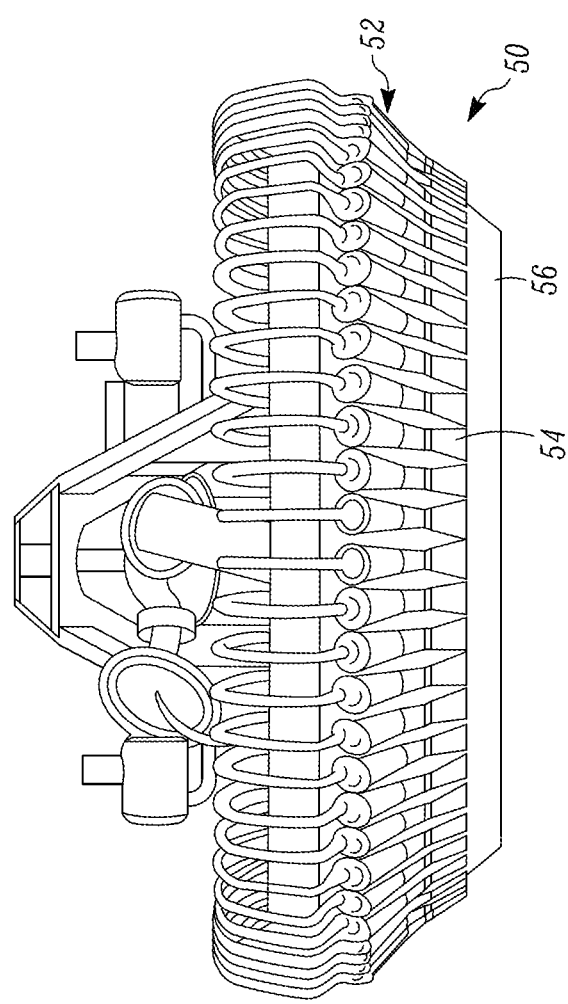
FIG. 2 is a side view of another hybrid rocket engine described herein designed as an upper stage engine.

With reference to FIG. 1, a hybrid rocket engine 10 is illustrated. The engine 10 includes an injector section 12, which in turn is followed by a combustor 14 having an exit expansion nozzle 16. A solid propellant gas generator 18 that contains a suitable solid propellant is fixed to a front end of the engine 10. In this example, the gas generator 18 is not considered part of the engine 10, but is connected to the engine.

The engine 10 is designed to have a core flow of fuel-rich gas generator gases from the gas generator 18, with the core flow being surrounded with an annular injection of oxidizer. In the illustrated example, this is achieved by providing a single element coaxial injector 20 through which fuel-rich gas from the gas-generator 18 that creates the core flow 21 enters the engine as shown by the arrows.

At the same time, an oxidizer is introduced into the core flow 21 of fuel-rich gas from the gas generator 18 via one or more oxidizer inlets 22, an oxidizer manifold 24, and openings 26 in the coaxial injector 20. The manifold 24 surrounds the coaxial injector 20 and the openings 26 surround the core flow 21 of fuel-rich gas. Therefore, the oxidizer is injected generally annularly into the core flow 21. The fuel-rich gas vaporizes and decomposes the oxidizer and prepares it for effective, stable combustion. The mixture then flows into a main combustion chamber 28 of the combustor 14.

The hot, fuel-rich gas from the gas generator 18 and the annularly introduced oxidizer then flows into the main combustion chamber 28. The mixture is then ignited with the resulting combustion products then expanded through the nozzle 16 to produce thrust.

In one embodiment, the combustion chamber 28 can be lined with fuel-rich material whether gas generator or inert, insulative materials.

The solid propellant used in the gas generator 18 is preferably designed to minimize the amount of oxidizer that is present, including only enough oxidizer to produce a burn rate that meets the requirements of the engine design. In one embodiment, the gas-generator propellant has the following properties: insensitive so as to maintain the overall safety of the system; fuel-rich by as much as possible to maximize the oxygen to fuel ratio which improves the system density; flame temperature high enough to burn with the oxidizer but low enough to simplify the system and not require exotic high temperature materials; and high exponent, which will enable larger throttle turn down ratios without large oxygen to fuel ratio shifts. In one non-limiting example, the solid propellant can include a binder, for example but not limited to hydroxyl-terminated polybutadiene (HTBP), a plasticizer, for example but not limited to dioctyl adipate, and a solid fuel oxidizer, for example but not limited to, ammonium perchlorate (AP) or smokeless gun powder (nitroglycerin/nitrocellulose). In one embodiment, the solid propellant can be paraffin with smokeless gun powder. In another embodiment, the solid propellant can be a 50% AP HTPB propellant with 0.5% carbon black to help increase the heat transfer from the flame to the propellant surface.

The oxidizer that is introduced into the fuel-rich gas from the gas generator 18 can be any oxidizer that supports the combustion of the fuel-rich gas from the gas generator 18. In one non-limiting example, the oxidizer is nitrous oxide ($N_2O$). $N_2O$ is a "green" oxidizer, is storable up to about 500 degrees Celsius, is non-toxic, and is often considered to be quite safe. $N_2O$ has suitable oxygen content for bipropellant combustion and the heat of formation, 19.61 kcal/mole, indicates energy stored in its molecular structure can provide extra energy for use in propulsion systems. Another favorable property of $N_2O$ is that it is self-pressurizing. This enables the design of an engine system that does not need pumps or an elaborate liquid expulsion system to pressurize the oxidizer. Finally, $N_2O$ boils at $-88.48°$ C. when not under pressure. This property causes the nitrous to gasify readily, allowing gas-gas mixing and combusting of the oxidizer and the fuel in the fuel-rich gas. Hydrogen peroxide, a mixture of nitrous oxide and hydrogen peroxide, and other mixed oxides can also be used as the oxidizer.

Turning to FIGS. 2, 3, 4A, 4B and 5, another example of a hybrid rocket engine 50 is illustrated. In this example, the engine 50 is also designed to employ a core flow of fuel-rich gas generator gases from a gas generator, with the core flow being surrounded with an annular injection of oxidizer.

Figure 3:
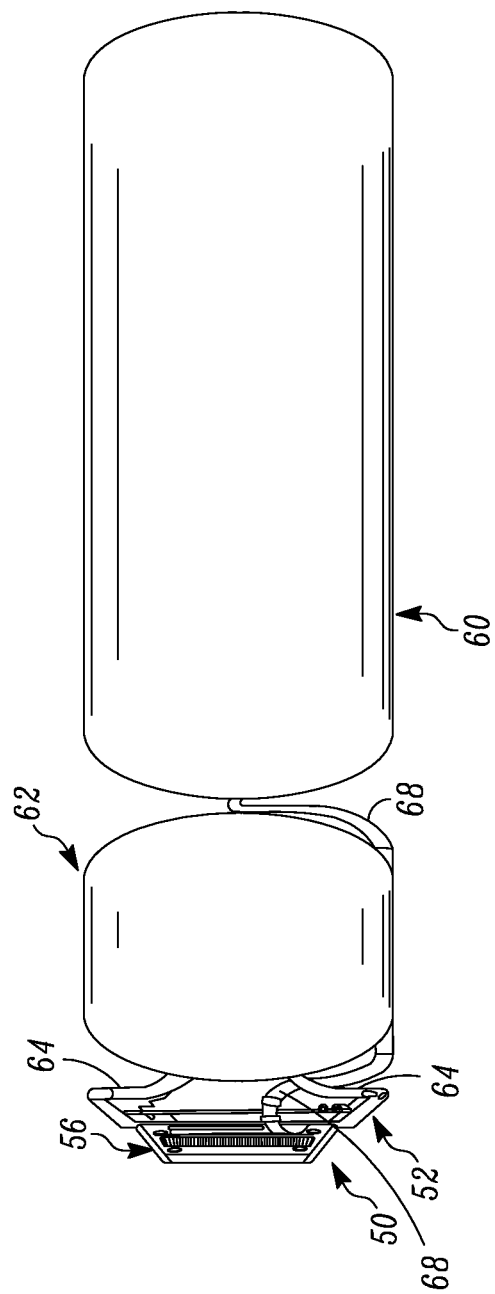
FIG. 3 illustrates an upper stage that employs the hybrid engine of FIG. 2 together with a gas-generator and an oxidizer tank.

In particular, with reference initially to FIG. 3, an exemplary upper stage arrangement that employs the engine 50 is illustrated. An oxidizer tank 60 that contains an oxidizer, for example $N_2O$, is arranged in line with a solid propellant gas generator 62 that contains a solid propellant as discussed above, followed in line by the engine 50.

As the propellant in the gas generator combusts, the fuel-rich gas therefrom is directed by pipes 64 into a first manifold 66 (see FIG. 4A) at the front end of the engine 50. The first manifold 66 in turn is in fluid communication with an array 52 of modular or individual thrust chambers 54 to feed the fuel-rich gas into the thrust chambers 54. The thrust chambers 54 are each designed as a coaxial injector which generates a core flow of fuel-rich gas generator gas into which an annular injection of oxidizer occurs.

Oxidizer from the tank 60 self-pressurizes and flows through one or more pipes 68 which is connected to a second manifold 70 (see FIG. 4A) of the engine 50. The second manifold 70 is in fluid communication with each of the individual thrust chamber 54 to annularly feed the oxidizer into the core flow of the fuel-rich gas.

Figure 4A:
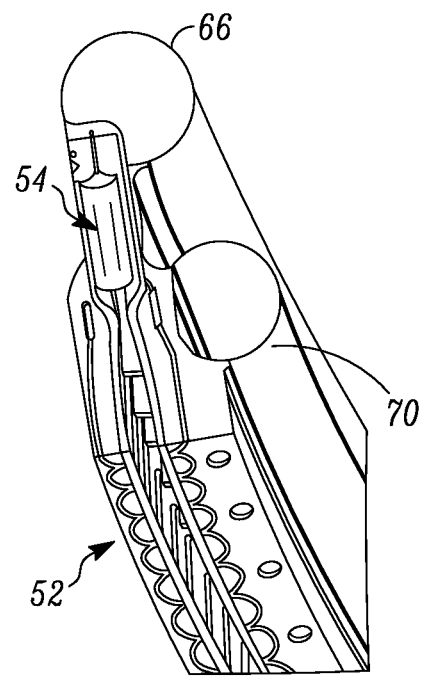
FIG. 4A illustrates a portion of the hybrid engine of FIG. 2 illustrating a plurality of the modular thrust chambers.
Figure 4B:
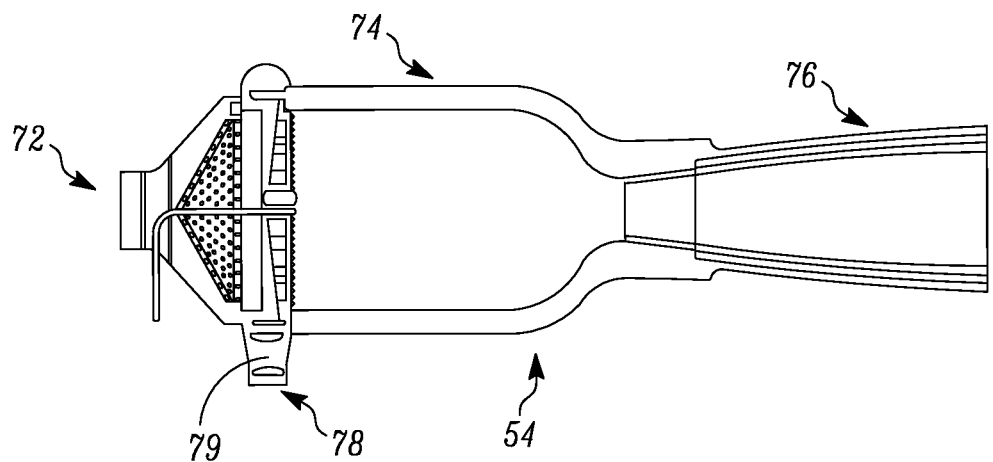
FIG. 4B is a detailed view of one of the modular thrust chambers.
Figure 5:
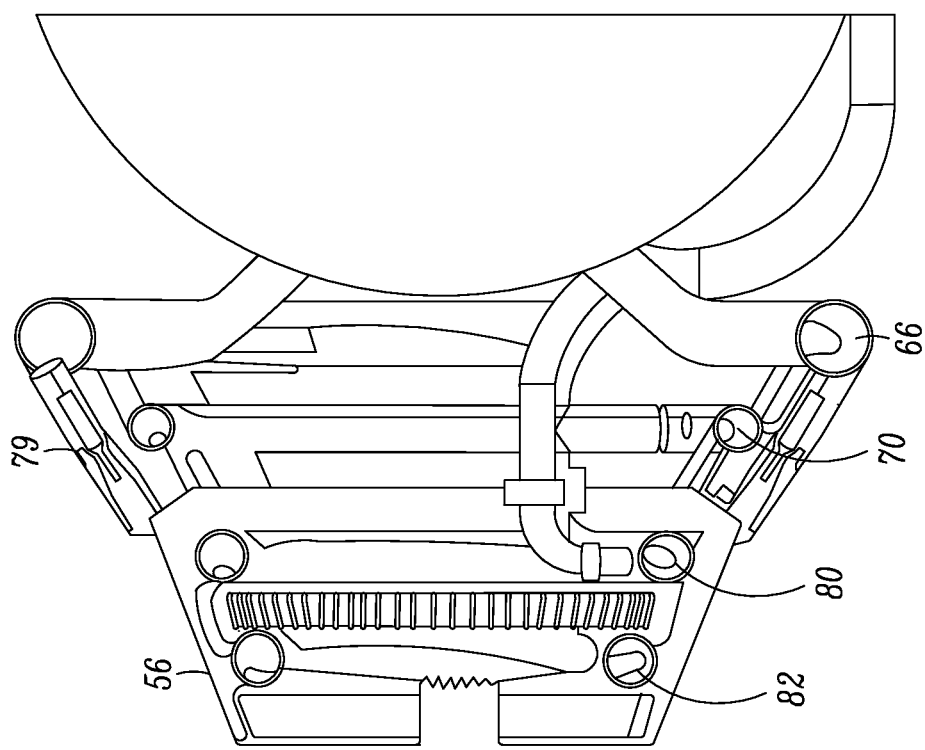
FIG. 5 is a close-up view of the engine of FIG. 2.

Turning to FIGS. 4A, 4B and 5, details of the array 52 and the individual thrust chambers 54 will now be described. As shown in FIG. 4A, the array 52 comprises a plurality of the thrust chambers 54 arranged side-by-side, the first manifold 66 and the second manifold 70. The array 52 is disposed around an aerospike nozzle 56 at the forward end thereof so that the array surrounds the outer surface of the nozzle 56. The number of thrust chambers 54 used can vary based on factors such as the thrust and nozzle area ratio for a given chamber pressure. In one non-limiting example, for an upper-stage engine, there can be 66 individual thrust chambers. Additionally, the individual thrust chambers 54 with core gas propellant-annular oxidizer injection maximizes combustion stability and throttle-ability.

FIG. 4B illustrates one of the thrust chambers 54. Each thrust chamber includes an inlet 72 at a first end that is in fluid communication with the first manifold 66 to receive fuel-rich gas and form the core fuel-rich gas flow. Oxidizer from the second manifold 70 is annularly introduced into the core flow via an oxidizer inlet 78 that is in fluid communication with the second manifold 70 and an injection manifold 79 that surrounds the core fuel-rich gas flow that flows through the inlet 72. The injection manifold 79 includes openings to achieve an annular injection of the oxidizer into the core gas flow in a similar manner to that discussed above for the engine 10 Unused oxidizer from the second manifold 70 is returned to the oxidizer tank via a return manifold (see FIG. 5). Each thrust chamber 54 further includes a combustion chamber 74 and an expansion nozzle 76.

In one embodiment, the combustion chamber 74 and the nozzle 76 can be cooled by the oxidizer before the oxidizer is injected into the core flow of fuel-rich gas. Oxidizer for cooling the chamber 74 and the nozzle 76 is fed to a supply manifold 80 and returned to the oxidizer tank via a return manifold 82, where the manifolds 80, 82 are located on the aerospike nozzle 56.

In operation, the gas-generator's 62 propellant burns in much the same manner as a solid rocket motor except it is very fuel-rich and substantially cooler than traditional solid propellant exhaust. The fuel-rich gas travel down the core of the gas-generator chamber and into the top of the engine 50 and from there into the modular thrust chambers 54. At the same time, oxidizer from the oxidizer tank 60 is introduced into the thrust chambers 54. The nominal chamber pressure targeted is sufficient to allow the oxidizer to self-pressurize the system.

The fuel-rich core gas flow mixes coaxially with the oxidizer at the head-end of the combustion chamber 74 and then flows into the combustion chamber where the gas is combusted. The combusted gases then exit the thrust chambers 54 through the nozzles 76 and then expand along the outer surface of the aerospike nozzle 56.

As with the engine 10, each combustion chamber 74 can be lined with fuel-rich material whether fuel-rich gas generator or inert, insulative materials.

Figure 6A:
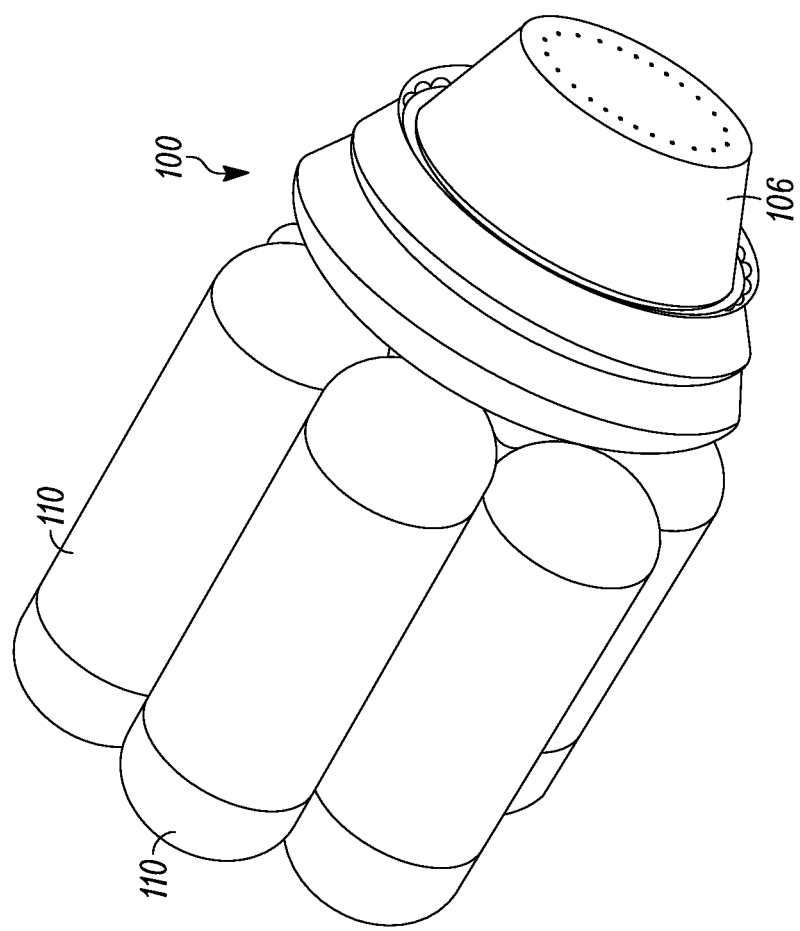
FIG. 6A is a perspective view of another upper stage that employs a hybrid engine and multiple tanks.
Figure 6B:
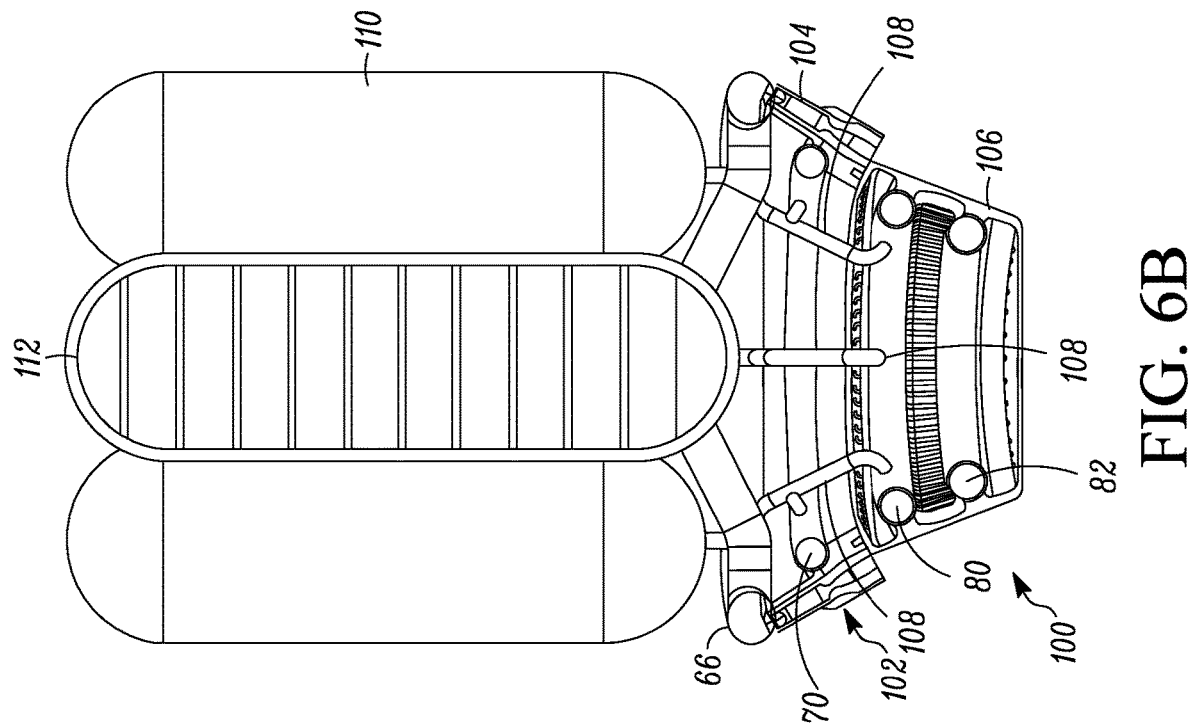
FIG. 6B is a partial cross-sectional view of the upper stage of FIG. 6A.

FIGS. 6A and 6B illustrate another example of an upper stage that employs an embodiment of a hybrid engine 100. This embodiment of the engine 100 is substantially similar to the engine 50, including an array 102 of modular or individual thrust chambers 104 designed as coaxial injectors arranged surrounding an aerospike nozzle 106. A plurality of oxidizer feed lines 108 are disposed within the engine and feed oxidizer to the manifolds 70, 80 from individual oxidizer tanks 110 rather than a single oxidizer tank as used with the engine 50. In addition, the upper stage includes one or more solid propellant gas generators 112. The tanks 110, 112 are arranged in parallel, for example with the oxidizer tanks 110 surrounding the gas generator 112, to allow for tight packaging.

FIGS. 7A and 7B illustrate a comparison of the engine 50 described herein to a prior art booster engine 150. The engine 50 has a smaller height H and nozzle width W compared to the height H and nozzle width W of the engine 150.

Although specific embodiments have been disclosed herein, those having ordinary skill in the art will understand that changes can be made to the specific disclosed embodiments without departing from the spirit and scope of the invention. Thus, the scope of the invention is not to be restricted to the specific disclosed embodiments. Furthermore, it is intended that the appended claims cover any and all such applications, modifications, and embodiments within the scope of the disclosure.

The invention claimed is:

1. A hybrid rocket engine, comprising:
   an aerospike nozzle having a first end, a second end and an outer surface;
   a solid-propellant gas generator that includes a solid propellant that produces a fuel-rich gas;
   a first manifold fluidly connected to the solid-propellant gas generator and receiving the fuel-rich gas therefrom;
   an oxidizer tank containing a liquid oxidizer;
   an array of modular thrust chambers arranged around the outer surface of the aerospike nozzle at the first end;
   a second manifold fluidly connected to the oxidizer tank and located entirely within a space defined by the array of modular thrust chambers;
   wherein each of the modular thrust chambers includes:
   a combustion chamber that combusts a mixture of the fuel-rich gas and an oxidizer gas produced from the liquid oxidizer;
   an expansion nozzle connected to the combustion chamber downstream of, and in fluid communication with, the combustion chamber through which combustion products from the combustion chamber are expanded, the expansion nozzle includes an outlet through which the expanded combustion products are discharged along the outer surface of the aerospike nozzle to produce thrust;
   an injector that is in fluid communication with the first manifold and the combustion chamber, and wherein the injector is upstream of the combustion chamber; and
   an injection manifold, the injection manifold is in fluid communication with the second manifold and the injector.

2. The hybrid rocket engine of claim 1, wherein the injector is a coaxial injector with a single passageway that is coaxial to an axis of the outlet of the expansion nozzle and the single passageway is in fluid communication with the combustion chamber.

3. The hybrid rocket engine of claim 1, wherein the first manifold is ring-shaped, and the second manifold is ring-shaped and has a diameter that is smaller than a diameter of the first manifold.

4. The hybrid rocket engine of claim 3, wherein the first manifold and the second manifold are concentric with one another.

5. The hybrid rocket engine of claim 1, wherein the second manifold receives oxidizer through an inlet located entirely within the space defined by the array of modular thrust chambers.

6. An upper-stage booster, comprising:
   an oxidizer tank containing a liquid oxidizer;
   a solid-propellant gas generator that includes a solid propellant that produces a fuel-rich gas;
   a first manifold fluidly connected to the solid-propellant gas generator and receiving the fuel-rich gas therefrom;
   a second manifold fluidly connected to the oxidizer tank;
   a rocket engine downstream of the oxidizer tank and the solid-propellant gas generator, the rocket engine includes:
   an array of modular thrust chambers arranged around an outer surface of an aerospike nozzle at a first end of the aerospike nozzle, each of the modular thrust chambers includes:
   a combustion chamber that combusts a mixture of the fuel-rich gas and in oxidizer gas produced from the liquid oxidizer;
   an expansion nozzle connected to the combustion chamber downstream of, and in fluid communication with, the combustion chamber through which combustion products from the combustion chamber are expanded, the expansion nozzle includes an outlet through which the expanded combustion products are discharged along the outer surface of the aerospike nozzle to produce thrust;
   an injector that is in fluid communication with the first manifold and the combustion chamber and wherein the injector is upstream from the combustion chamber; and
   an injection manifold, the injection manifold is in fluid communication with the second manifold and the injector; and
   wherein the second manifold is located entirely within a space defined by the array of modular thrust chambers.

7. The upper stage booster of claim 6, wherein the injector is a coaxial injector with a single passageway that is coaxial to an axis of the outlet of the expansion nozzle and the single passageway is in fluid communication with the combustion chamber.

8. The upper stage booster of claim 6, wherein the first manifold is ring-shaped, and the second manifold is ring-shaped and has a diameter that is smaller than a diameter of the first manifold.

9. The upper stage booster of claim 8, wherein the first manifold and the second manifold are concentric with one another.

10. The upper stage booster of claim 6, wherein the second manifold receives oxidizer through an inlet located entirely within the space defined by the array of modular thrust chambers.

\* \* \* \* \*